Oct. 30, 1951  L. KNIEL  2,573,341
PRODUCTION OF ETHYLENE
Filed Dec. 19, 1946  2 SHEETS—SHEET 2
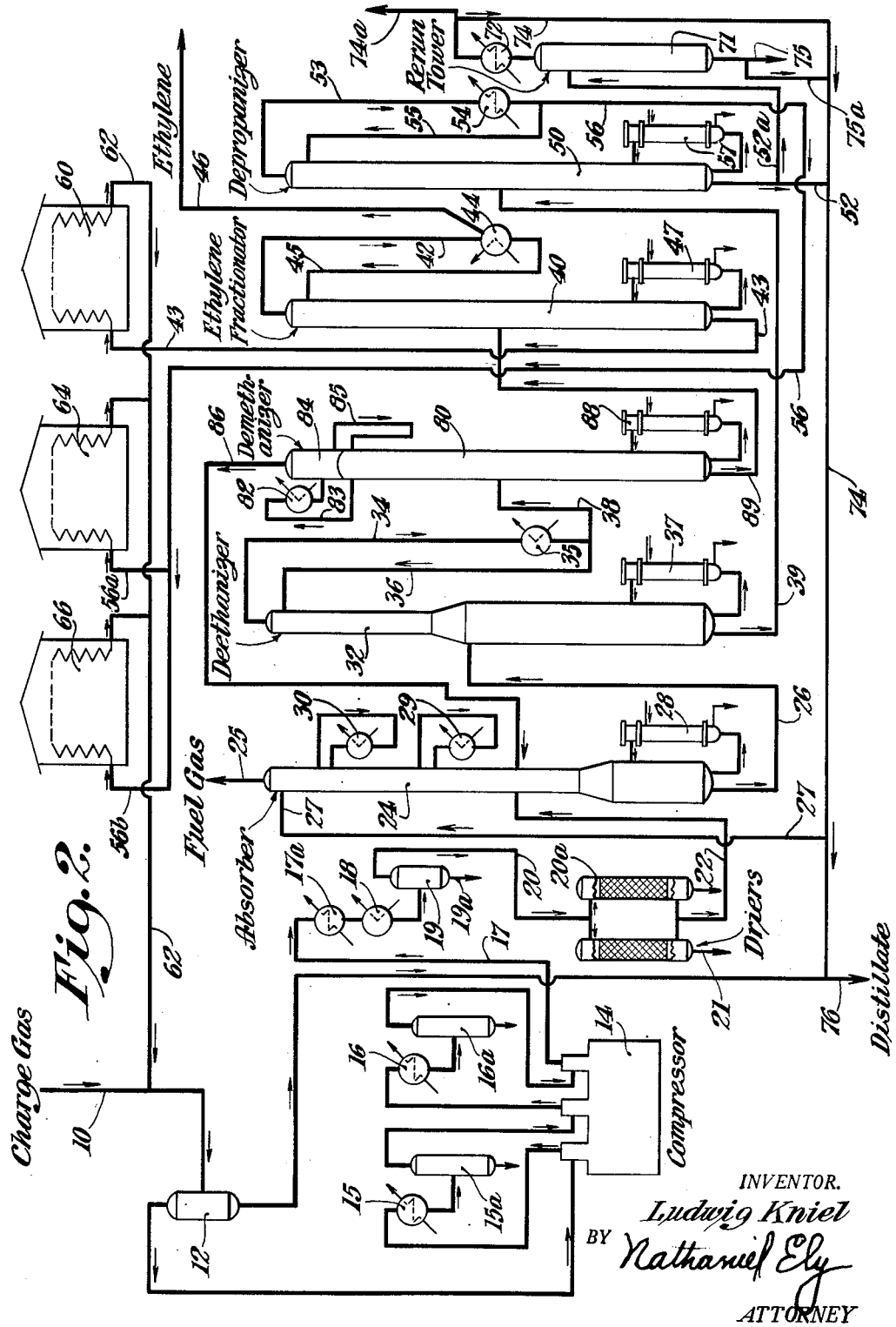
INVENTOR.
Ludwig Kniel
BY Nathaniel Ely
ATTORNEY Patented Oct. 30, 1951

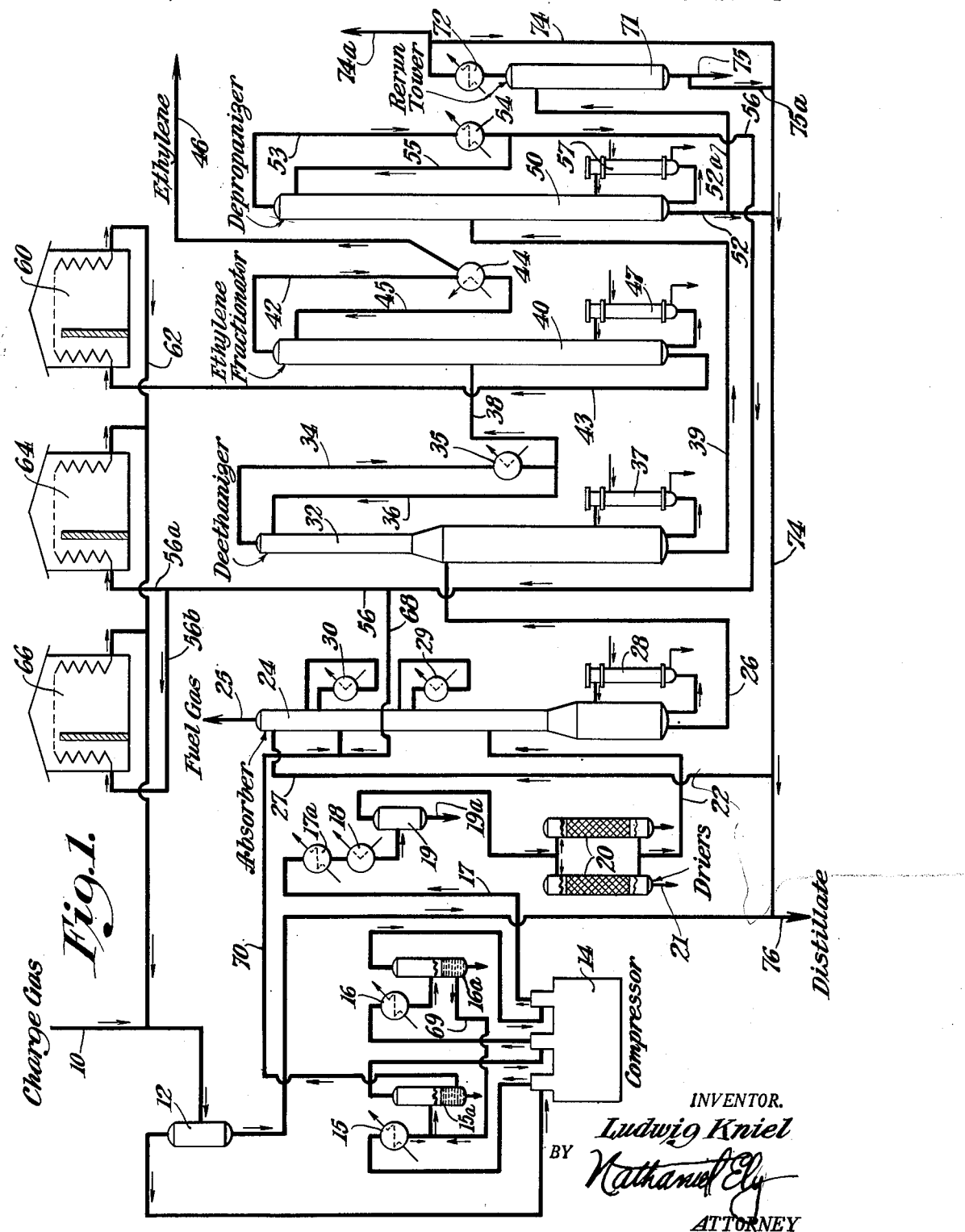

2,573,341

UNITED STATES PATENT OFFICE 2,573,341

PRODUCTION OF ETHYLENE

Ludwig Kniel, Scarsdale, N. Y., assignor to The Lummus Company, New York, N. Y., a corporation of Delaware Application December 19, 1946, Serial No. 717,264

3 Claims. (Cl. 260—683)

This invention relates to the production and recovery of olefinic hydrocarbons and more particularly high purity ethylene. It is a continuation-in-part of my copending application Serial No. 493,176 filed July 2, 1943, entitled "Hydrocarbon Conversion," now abandoned.

It is well known that the hydrocarbon gas field, and particularly, refinery off-gases offer a very large potential supply of olefinic hydrocarbons such as ethylene and propylene which do not otherwise occur naturally, and that these gases are of tremendous importance in the synthetic chemical field. They are useful not only for the manufacture of synthetic alcohols and rubber but also for certain types of plastics and many other purposes. However, ethylene and propylene are very difficult to separate from the other gases such as propane and ethane with which they are normally associated. In addition, the large amounts of contaminant gases such as methane and hydrogen usually found in refinery off-gases necessitates the use of large and expensive equipment for the separation of the ethylene. In the past, methods for separating the ethylene from such contaminants have unavoidably incurred the loss of substantial amounts of valuable components such as ethylene. Furthermore, the variation in concentration of the components in the various hydrocarbon fractions has made it extremely expensive to construct a single system which would be of general application to the recovery of the olefinic hydrocarbons from the various feeds. Therefore, if the relatively pure olefins are to find an expanding market, it is necessary to provide substantial economics of utilities in the separation of the valuable olefins from the gases with which they are normally associated.

The principal object of my invention is to recover substantially pure ethylene from a gaseous mixture containing large proportions of methane and hydrogen by the use of a rectifier-absorber tower wherein substantially all of the methane and hydrogen may be removed overhead in the tower, thus relieving the rest of the system following the tower of this load and materially reducing the unavoidable loss of the valuable components such as ethylene.

A further object of my invention is to build up an aromatic distillate in the system to be used as the absorption oil in the rectifier-absorber by cracking the paraffin and olefin fractions other than ethylene.

A still further object of the invention is to provide two stages of demethanization with the overhead from the second stage being returned to the first so that there will be substantially no loss of ethylene in the methane and hydrogen and to recover an ethylene product of very high purity.

Further objects and advantages of my invention will appear from the following description thereof taken in conjunction with the attached drawings, in which:

Fig. 1 is a schematic process flow diagram of the units for production and recovery of ethylene.

Fig. 2 is a modified schematic process flow diagram for the production and recovery of high purity ethylene.

In accordance with my invention, I find that ethylene can be economically recovered from various types of available hydrocarbon gas streams in which the hydrogen and methane are generally a large proportion, and the ethylene, a rather small proportion, if present at all. The following table lists the compositions of several typical streams, but is not intended to be the extent to which my invention is applicable.

Composition of ethylene bearing gas streams

[Mol per cent]

| Comp. | (a) Coke Oven Gas | (b) Refinery Off Gas | (c) Pyrolysis Gas from Propane |
|---|---|---|---|
| $H_2$ | 44.0 | 4.0 | 10 |
| $CH_4$ | 25.0 | 11.0 | 25 |
| $C_2H_4$ | 4.0 | 5.0 | 27 |
| $C_2H_6$ | | 22.0 | 4 |
| $C_3H_6$ | 2.0 | 11.0 | 15 |
| $C_3H_8$ | | 45.0 | 16 |
| Heavier | | | 3 |
| CO | 6.0 | | |
| $CO_2$ | 4.0 | 2.0 | |
| $N_2$ | 15.0 | | |
| Total | 100.0 | 100.0 | 100.0 |

With such high concentrations of hydrogen and methane, I find it important to remove such materials first not only to render subsequent separation of the olefins easier, but also, to materially reduce the loads on other parts of the fractionating system. I accomplish this in one tower combining absorption of the heavier constituents in an absorbent oil of an aromatic nature with rectification of the mixture in the absorber whereby all of the hydrogen and nearly all of the methane are removed with practically no loss of ethylene. The fat oil, that is, the rich bottoms product from the rectifying absorption tower, is thereafter treated to recover a substantially pure ethylene product and a series of paraffin and olefin fractions other than ethylene which are returned to heaters for cracking to form an aromatic distillate, part of which is utilized in the absorber as the absorption oil. Operating in this manner, I obtain optimum yields of high quality ethylene at relatively low utility cost due in part, to the utilization of the aromatic by-products built up in the system.

Another advantage of the absorptive type of recovery unit, hereinafter described, is that it may be readily adapted to the use of charging stocks varying widely in composition. Refinery off-gases containing propane, ethane and ethylene nearly always represent a composite product gas from various refinery units. As a result of varying operating conditions in these refinery units, the composition and volume of the composite off-gas may fluctuate considerably. If, therefore, this gas is taken directly to the heaters for cracking, these heaters cannot be operated at optimum capacity and for optimum yields at all times due to the fluctuations in the concentration of hydrogen and methane in the charge gases. For this reason, I find it desirable to carry out a preliminary resolution of the charge gas into the ethylene producing constituents and the lighter, non-useful gases such as hydrogen and methane.

Assuming a refinery off-gas feed of a composition shown in the table above as entering the system at 10, the gas is passed through knock out drum 12 and then to compressor 14 where it is compressed in several stages to the desired superatmospheric pressure. The heat of compression is conveniently removed in the interstage coolers 15 and 16, the tanks 15a and 16a being used as liquid-gas separators. The high pressure gas then passes by line 17 through final cooler 17a after which it may be sub-cooled by refrigeration at 18 if desired and then passed to tank 19. Any condensed aromatic fractions heavier than pentane may be removed through line 19a. The mixture then passes through the dryers 20 from which the accumulated moisture may be removed periodically through line 21 by suitable methods well known in the drying art.

The mixture which discharges from the dryers 20 includes some of the moisture from the aftercooler 17a but is sufficiently dried to avoid the formation of hydrates. This mixture is then passed by line 22 to the rectifier-absorber 24 which is also sometimes referred to as an absorber-stripper. It consists of an upper absorption section and a lower stripping or stabilizing section and operates essentially as a fractionation tower as well as a countercurrent absorber. It is preferably operated such that a separation is made between the methane and lighter hydrocarbons which are removed overhead as to fuel gas line 25, and the ethylene and heavier fractions which are withdrawn as fat oil through line 26. As will hereinafter be described, aromatic fractions continuously produced in the cracking heaters and retained in the absorption system to the extent necessary, furnish the lean absorption oil which is introduced through line 27 to tower 24. Reboiler 28 is provided at the bottom of the column 24 in order to continuously drive off the most volatile materials—methane and hydrogen—and, as a result, the fat oil leaving tower 24 carries substantially no hydrogen and very little methane to interfere with further steps in the process.

The absorber 24 is normally equipped with two or more intercoolers 29 and 30 in the absorption section to control the absorption rate at this point. These coolers are necessary because the absorption reaction is decidedly exothermic and efficient absorption requires moderate temperatures.

The purity of the ethylene product is, in large measure, determined by the performance of the fractionating absorber 24. The principal contaminates present in the ethylene product are traces of methane and ethane. The separation of ethylene from ethane does not present any real difficulties and may be carried to any desired degree. The elimination of the methane in the absorber, on the other hand, is imperative as the proper functioning of the equipment downstream of the absorber is dependent on absorber performance. Larger amounts of methane than anticipated in the bottoms from the absorber would jeopardize the operation of the deethanizer and ethylene fractionator by inability to condense the reflux in these towers at the temperature required to obtain the desired concentrations in the overheads from each of these towers.

Experience has shown that at a pressure of 440 p. s. i. g. and 70° F. entering oil temperature, with the dewpoint of the feed at 100° F. and using an aromatic distillate formed in the system as the absorption medium, a lean oil rate of not over 4.2 pounds per pound of feed is sufficient to assure the retention of 99 mol per cent of the ethylene entering in the feed to the rectifier absorption tower. With this lean oil rate the absorber top and bottom temperatures are approximately 180° F. apart and little intercooling is necessary. In addition, all of the hydrogen, 96 per cent of the methane and only a small amount of ethylene are rejected in the absorber overhead at 25. Absorption oil rates of less than 4 pounds per pound of absorber charge may be used but an increased amount of intercooling is necessary with the decreased oil rates.

The fat oil leaving absorber 24 at 26 is forwarded to deethanizer tower 32 which is operated under such temperature and pressure that the ethane-ethylene fraction is completely removed overhead in line 34. This is condensed in the refrigerated reflux condenser 35 and reflux is returned to the column through line 36. The balance of the overhead is drawn off in line 38 to the ethylene fractionator 40. Reboiler 37 is provided for the bottom of deethanizer 32 and the heavy bottoms material is removed at 39 and passed to depropanizer 50 hereinafter described.

The ethylene fractionator 40, is conveniently operated under such conditions that a substantially complete separation is made between the ethylene removed in the overhead line 42 and ethane which is removed as bottoms through line 43. The ethane may then be passed to heater 60 for further cracking as hereinafter described. A refrigerated condenser 44 is provided on the overhead line 42 to supply the necessary reflux through line 45. The net ethylene product is removed through line 46. Reboiler 47 is used to maintain the desired bottom temperature. Practically 100 per cent recovery is accomplished in this tower and a purity of over 97% as to ethylene content can be accomplished.

The heavy material removed from the bottom of deethanizer 32 by line 39, consisting of propane, propylene and higher hydrocarbons, is separated in depropanizer 50 into an aromatic distillate as bottoms removed through line 52 and a propane-propylene overhead removed through line 53. The overhead is condensed at 54 to furnish reflux through line 55 and a cracking stock, largely propane and proylene, removed through line 56, is fed through lines 56a and 56b to sections 64 and 66 of the heaters. The lower part of depropanizer 50 is provided with bottoms reboiler 57.

The reaction sections 60, 64 and 66 of the heaters are operated at the optimum temperatures for the cracking of the different fractions entering the heaters. Temperatures in the order of 1410° F. are preferable for cracking propane-propylene mixtures whereas temperatures as high as 1430° F. are necessary for the cracking of ethane. When cracked at their optimum temperatures, I have noted a production of nearly twice as much ethylene as compared to the production of ethylene when the same quantity of ethane and propane are treated in a single furnace.

In addition to the ethylene the line 62 passes to the charge line 10 considerable amounts of hydrogen ethane, propane, propylene, higher hydrocarbon gases and substantial quantities of aromatics. The hydrogen, methane, ethylene, higher hydrocarbons and the aromatics are all formed by the cracking operation in the heaters. The aromatics form the active components in the absorption oil and with the other hydrocarbons are treated in the system as set forth above.

With the formation of substantial quantities of ethylene in the heaters and the removal of the unreactive hydrogen and methane in the absorber, it is possible to produce and recover nearly twice as much ethylene with the same equipment as was otherwise possible. The mixing of the effluent of the different heaters with the charge has also proved particularly satisfactory.

It will thus appear that the normally gaseous feed is first introduced to the absorber rather than to the heater as in most prior practice. This is in the nature of a prefractionating step in that it immediately makes it possible to eliminate most of the methane and all of the hydrogen, thereby, reducing the volume of material being treated in the remainder of the system.

An important feature of my invention, therefore, is the opportunity to obtain maximum yields of a high purity ethylene with minimum yields of other materials as by-products and the opportunity to operate all units under optimum conditions while at the same time providing the necessary flexibility for varying compositions of feed to the ethylene recovery system.

If desired, a light oil fraction, having a high propane-propylene content, removed from line 56 by line 68 may be introduced through line 68 to the absorber 24 as a supplementary absorbent. This enters the absorber at a point below the lean oil line 27 since it is composed of considerably lighter components than the lean oil.

It may also be found desirable to use a part of the higher boiling aromatic fraction collected in drums 15a and 16a as a supplementary absorbent entering absorber 24 through lines 69 and 70. Net distillate may be removed through line 76 from knock-out drum 12 and from depropanizer bottoms 52. With usual refinery off-gas, substantial distillate builds up and must be removed from the system from time to time.

If it is found necessary to change the quality of the distillate removed from the depropanizer for absorption purposes, a part of the bottoms from the depropanizer 50 is removed through line 52a to rerun tower 71. With this control, a predetermined quality of charge oil can be made for the absorber 24. The rerun tower rejects either the heavy ends, or in case of an accumulation of light components, the front end fractions of the lean oil. If there is an accumulation of heavy ends in the lean oil from the bottom of tower 50, it may be rejected by way of line 75 and the remaining lighter components passed back to line 27 by way of the overhead line 74. If there is an excess of the light or front end fractions the bottoms from rerun tower 71 will be passed through line 75a to line 74 and the light fractions will pass from the system by way of line 74a.

When recovering a 93 per cent pure ethylene product and at furnace recycle ratios (recycle—fresh feed) of approximately 1.0, the principle tower operating conditions are those shown in the following tabulation:

Summary of tower operating conditions

| Designation | Pressure, p. s. i. g. | Temperature, °F. | | | | Reflux Ratio, Mol/Mol O. H. |
|---|---|---|---|---|---|---|
| | | O. H. | Top | Feed | Bottoms | |
| Absorber | 460 | 0 | [1] 0 | 0 | 125 | |
| Deethanizer | 450 | 16 | 36 | 120 | 232 | 3.0 |
| Ethylene Fractionator | 385 | 1 | 4 | 20 | 49 | 5.2 |
| Depropanizer | 220 | 112 | 106 | 225 | 350 | 1.0 |
| Rerun Tower | 25 | 150 | 260 | 350 | [2] 400 | 0.4 |

[1] Temperature of lean oil entering.
[2] Maximum.

A modified form of arrangement of my invention is shown in Fig. 2. In this form, the parts having the same general function have the same numbers and as before the refinery off-gas enters the system at 10 with the gas passing through a knock-out drum 12 and then to compressor 14 where it is compressed to the desired superatmospheric pressure. The heat of compression is conveniently removed at interstage condensers 15 and 16 with liquid-vapor separator tanks 15a and 16a permitting the removal of some liquid as before. The high pressure gas is then passed through line 17, through final cooler 17a and subcooler 18 into tank 19 from which liquid aromatic fractions, heavier than pentane are removed through line 19a. The balance of the material then passes through dryers 20 from which it discharges through line 22 to absorber 24.

As in the prior case, absorber 24 is operated under such conditions of temperature and pressure that substantially all of the hydrogen and the major part of methane is removed overhead to a fuel gas line 25 and the heavier fractions are removed as fat oil through line 26.

The fat oil leaving through line 26 is passed forward to deethanizer tower 32 in which a separation is made between the ethane-ethylene fraction and the propane-propylene and higher hydrocarbon fractions with the ethane-ethylene fraction passing overhead through line 34 and a bottoms mixture in line 39 passing to depropanizer column 50. The net balance of the overhead after removing reflux requirements through line 36 then passes in this case to a demethanizer column 80.

The demethanizer tower 80 is provided with an overhead condenser 82 on the line 83 in which a portion of the mixture from the top of tower 80 is condensed. A separate tank 84 is built into the top of the column serving as an accumulator for the vapor-liquid mixture from condenser 82. A trap line 85 returns the liquid to the column 80 as reflux and the vapors pass through line 86 to tower 24. These vapors include any remaining methane, and depending on the temperature in the condenser 82, more or less ethylene. Preferably, I make a crude separation allowing sufficient ethylene to go overhead to be certain that all methane is removed. This overhead is then returned to the absorber 24 at about the same point in column 24 as line 22. Reboiler 88 is provided to maintain the bottoms temperature of the demethanizer 80 at the desired point and the bottoms product, a substantially pure ethane-ethylene fraction, is removed by line 89 to the ethylene fractionator 40.

In tower 80, a complete separation of the ethylene and methane is uneconomical because of the low operating temperature that would be required to effect such a separation in this tower. By passing a small per cent of the ethylene off with the methane as overhead, the operating temperature in column 80 may be raised to an economical point. The small amount of ethylene in the overhead is thus continuously recycled between the absorber 24 and demethanizer 80. It has been found that it is only necessary to recycle about three per cent of the ethylene entering tower 80 to obtain the desired operating temperature in tower 80.

The ethylene fractionator 40 is now operated under such conditions that ethylene of 99+% purity can be recovered in line 46. The bottoms material which is largely ethane is again removed through line 43 and is preferably passed to cracking heater 60.

The bottoms material from the de-ethanizer 32 which is removed through line 39 to depropanizer 50 is again similarly fractionated to separate the propane-propylene fraction which is sent to heaters 64 and 66 and the aromatic distillate which is used in part as the absorber oil and which passes from depropanizer 50 by way of line 52. Tower 71 is operated as before.

The composition of the lean oil introduced through line 27 to the rectifier-absorber 24 will vary considerably depending upon the charge to the system and the conditions of cracking in heaters 60, 64 and 66. It is largely benzene, toluene and naphtha but, in addition, has a considerable percentage of butene, pentene, hexene and heavier hydrocarbons. An example of one analysis of oil after repeated recycle in the refinery off-gas recovery system is as follows:

*Composition of lean oil*

| Component | Boiling Range, °F. | Specific Gravity | Mol Weight | Weight Per Cent |
|---|---|---|---|---|
| Propylene | −54 | | | 1.1 |
| Propane | −42 | | | 2.2 |
| Butenes | 20 | | | 8.2 |
| Butane | 32 | | | .6 |
| Pentenes | 35–172 | .75 | 71 | 5.5 |
| Benzene | 172–181 | .88 | 78 | 44.1 |
| Hexenes | 181–228 | .85 | 82 | 4.4 |
| Toluene | 228–234 | .85 | 92 | 9.9 |
| Naphtha | 234–316 | .84 | 110 | 12.0 |
| Heavier | 316 plus | .93 | 165 | 12.0 |
| Total | | | 82 | 100.0 |

It will thus be seen that the foregoing system has the following advantages as applied to the purification of ethylene.

(1) Inherent flexibility to take adequate care of wide fluctuations in volume and composition of the charge gas.

(2) Joint and, therefore, economical resolution of the charge and effluent gas streams into fuel gas, ethylene product and closely fractionated furnace charge streams.

(3) Recovery of a highly purified product at very small losses and without the need for fractionation at extremely low temperature.

(4) Ease of control by the single expedient of adjusting the operating temperature level of the fractionating absorber.

(5) Avoidance of special materials of construction.

While I have shown and described a preferred form of embodiment of my invention, I am aware that variations may be made thereto and I therefore desire a broad interpretation of my invention within the scope of the disclosure herein and the following claims.

I claim:

1. The process of recovering ethylene from a normally gaseous mixture thereof which includes hydrogen, which comprises passing said mixture in countercurrent relation to a hydrocarbon absorption oil which is largely aromatic under a substantial superatmospheric pressure and at a temperature wherein all materials boiling above methane plus some methane are absorbed, removing hydrogen and a substantial part but less than all of the methane overhead, maintaining a bottoms temperature sufficient to drive most of the methane out, removing the absorbent mixture from the bottom of the absorber and rectifying it in the presence of reflux condensate into an overhead comprising the volatile hydrocarbons of not more than two carbon atoms per molecule, and a liquid bottoms component, further rectifying said volatile overhead in a second stage in the presence of reflux condensate to remove a gaseous overhead consisting of methane and some ethylene, returning said gaseous overhead to the absorber, and rectifying in a third stage in the presence of a reflux condensate the bottoms of said second stage rectification to recover a substantially pure ethylene overhead from a mixed higher boiling hydrocarbon.

2. The process of recovering ethylene as claimed in claim 1 in which the mixed higher boiling hydrocarbon is further fractionated in the presence of reflux to separate an olefin-paraffin fraction from an aromatic distillate which is used in part as the hydrocarbon absorption oil, and in which the olefin-paraffin fraction is cracked in the presence of heat and the cracking effluent is returned to the normally gaseous charge mixture.

3. The process as claimed in claim 2 in which the absorption oil contains substantial amounts of naphtha, toluene, hexenes, benzene, pentenes and butenes and has an average molecular weight of approximately 82.

LUDWIG KNIEL.

REFERENCES CITED

The following references are of record in the file of this patent:

UNITED STATES PATENTS

| Number | Name | Date |
|---|---|---|
| 2,014,724 | Eastman | Sept. 17, 1935 |
| 2,168,610 | Schutt | Aug. 8, 1939 |
| 2,187,631 | Schutt | Jan. 16, 1940 |
| 2,226,467 | Hjerpe et al. | Dec. 24, 1940 |
| 2,230,219 | Carey | Feb. 4, 1941 |
| 2,241,717 | Robinson et al. | May 13, 1941 |
| 2,340,778 | Steward et al. | Feb. 1, 1944 |
| 2,381,175 | Mattox | Aug. 7, 1945 |
| 2,389,144 | Evans et al. | Nov. 20, 1945 |
| 2,439,080 | Davies | Apr. 6, 1948 |